Nov. 5, 1968
A. A. HAYATIAN
3,409,306
BEARING SEAL STRUCTURE
Filed Oct. 21, 1964
2 Sheets-Sheet 2
FIG_2
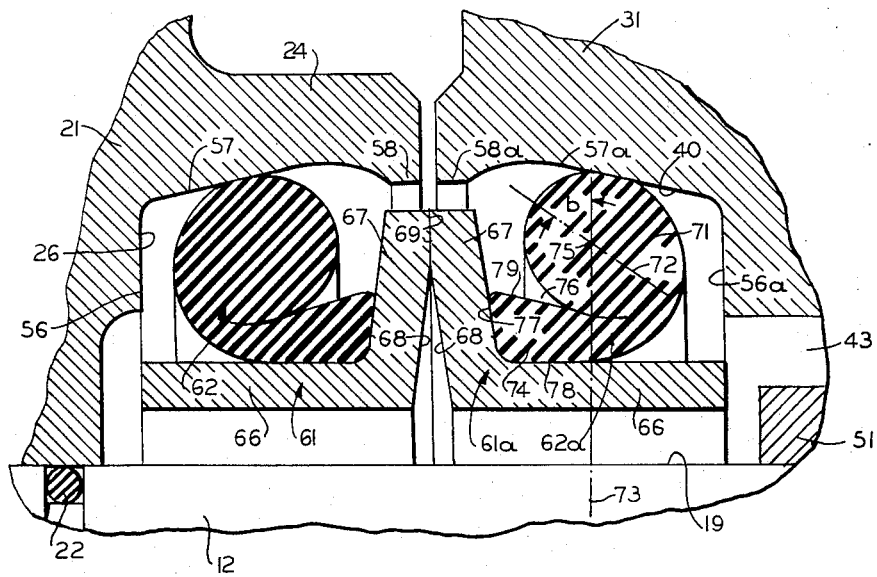
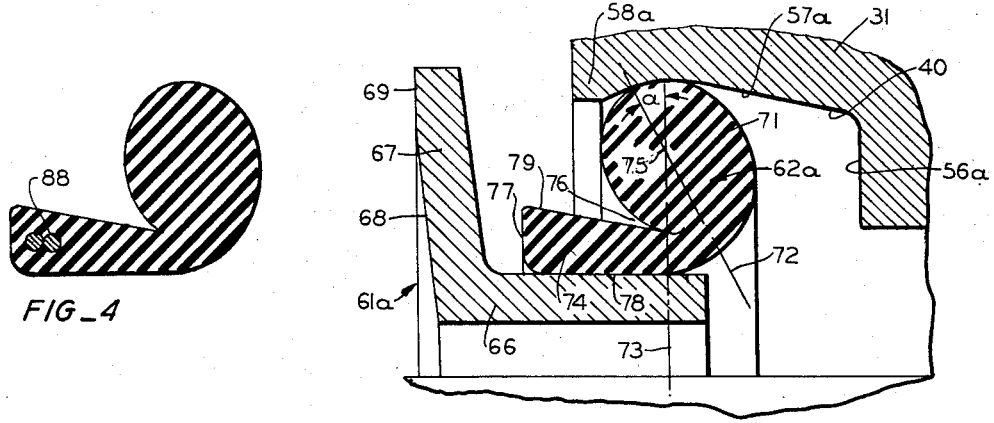
FIG_3
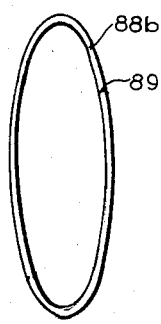
FIG_4
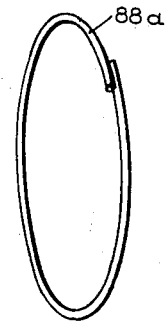
FIG_5  FIG_6
FIG_7
INVENTOR.
ALLAN A. HAYATIAN
BY
*Julian Caplan*
ATTORNEY ic Office 3,409,306
Patented Nov. 5, 1968

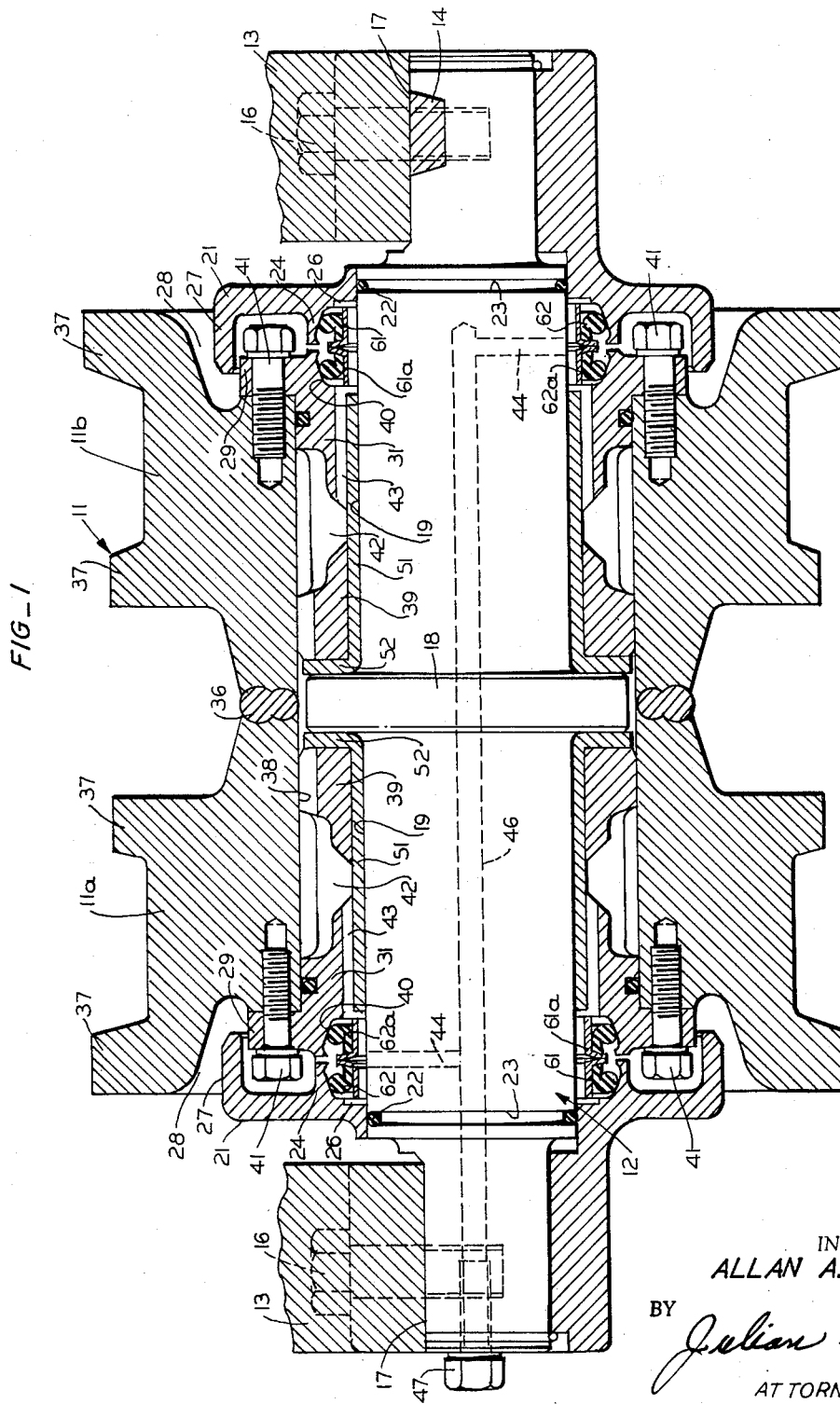

3,409,306
BEARING SEAL STRUCTURE
Allan A. Hayatian, Lomita, Calif., assignor, by mesne assignments, to Pettibone Mulliken Corporation, a corporation of Delaware
Filed Oct. 21, 1964, Ser. No. 405,455
12 Claims. (Cl. 277—92)

This invention relates to a new and improved bearing seal structure.

A particular environment for the use of the present invention is in sealing the bearings of the track roller of crawler tractors, an installation wherein the bearing seals are of vital importance to protection of the bearing and wherein the forces and conditions to which the seals are subjected are extremely severe. A conventional crawler type tractor has on either side thereof a substantially horizontal track rail which supports the weight of the tractor. Substantially horizontal shafts interconnect portions of the rail and are stationarily secured thereto. Rotatable about each shaft is a roller which is supported by the crawler track. Interposed between shaft and roller is a bearing which is suitably lubricated. Sealing the bearing against egress of lubricant and ingress of water, mud, rock and other contaminants which might destroy the bearing, is the principal object of the present invention.

It will be understood that track rollers and their supporting shafts are subject to unusually severe forces as the tractor moves over uneven ground and moves heavy loads. In the first place, the weight of tractors and the loads which they push or pull are very heavy. Further, the loads are unevenly applied in that a major portion of the load may be borne first by the rollers on one side of the tractor and then the other, or by the rollers at the front and then at the rear of the tractor and by reason of slippage of the track, terrain and other factors the effective load may increase and diminish repeatedly. Still further, end thrust may be applied alternately from either axial direction intermittently. Additionally, the parts of the roller bearing tend to wear with the passage of time, setting up new conditions as contrasted with those when the bearing surfaces are new. These and other factors are among the most severe operating conditions under which bearings may be called upon to perform.

The present invention provides a seal preventing leakage of lubricant from the bearing which maintains the seals substantially intact under all of the foregoing severe operating conditions.

The ground over which the tractor operates is also a severe test for the seal of the bearings. Thus crawler tractors traverse ground covered with layers of water and mud. Additionally, such tractors may traverse areas where rock and gravel create an atmosphere of rock and gravel dust or where said and silt tend to penetrate through the bearing seal and into the bearing. A seal which will effectively withstand penetration of these contaminants is essential to preservation of the life of the bearing. The present invention provides a seal which will effectively protect the bearing against entry of such material.

The seal which is the subject of this invention is of the type known as a metal-to-metal seal wherein two contacting metal flanges are turned relative to each other, the interface of the seal being very accurately lapped. It is essential that means be provided to maintain the sealing flanges in contact with each other, both initially and after they wear with the passing of time, and to maintain such contact against the ingress of the contaminants heretofore mentioned despite the severe stresses tending to separate the interface under operating conditions. In addition, means is provided in accordance with this invention for sealing one metal flange to the roller and the other metal flange to the shaft to prevent leakage of contaminants around the interface. It is an important feature and advantage of the present invention that resilient means is provided which functions both to bias the interface into close sealing contact and at the same time seals the metal flange members to the surrounding structure of either the shaft or roller.

The present invention relates to improved sealing means and techniques and is particularly useful where it is desired to seal the space between two relatively rotating parts which may serve as a housing for either a rotating or non-rotating shaft.

In general, the arrangement as described herein involves a rotating part and a non-rotating part that serve as a housing within which a pair of metal flanged ring-shaped sealing members have abutting lapped surfaces and are floatingly maintained in the housing with such surfaces maintained in abutment by a pair of speciallly formed elastic or resilient sealing rings that cooperate with the housing and metal ring-shaped sealing rings in a special manner.

It is therefore an object of the present invention to provide a new sealing structure as indicated above.

Another object of the present invention is to provide an improved sealing structure between rotating parts.

Another object of the present invention is to provide an improved sealing arrangement which is efficient, light in weight and simple and compact, using a relatively small number of parts.

Another object of the present invention is to provide a sealing structure of this character wherein the component parts are few in number and allow themselves to be made inexpensively but with precision.

Another object of the present invention is to provide an improved sealing structure characterized by the fact that the same may be assembled without special instructions and without special tools.

A still further object of the present invention is to provide a seal comprising a pair of metal flanged ring-shaped sealing members, having abutting lapped surfaces which are floatingly maintained in abutment by a pair of specially formed elastic or resilient sealing rings. The sealing rings have a particular, cross-sectional configuration, which comprises a round, outer portion, which bears against the outer wall of the recess in which the rings are installed, and a tangential inner portion which, in assembled position, engages the outside of the cylindrical portion of the metal sealing rings. When the seal assembly is installed, the outer end of the tangential portion of the resilient seal is engaged and pushed inwardly by the flange of the metal sealing ring, thereby distorting the relaxed shape of the metal sealing ring so that it is stressed. In stressed position, the resilient sealing ring performs two important functions. The first function is to bias the metal sealing ring into face-to-face contact with a mating-sealing ring, which function is performed by inward compression of the tangentially disposed portion. The second function of the resilient sealing ring is to form a lubricant-type seal between the metal seal ring and the structure in which it is installed. This second function of the resilient-sealing ring is accomplished by reason of the deformation of the ring which distorts the ring radially-outwardly relative to the axis of rotation of the metal sealing ring and thus causes a tight fit of the resilient sealing ring with the wall of the structure in which it is installed and with the cylindrical portion of the metal sealing ring around which it fits.

In certain versions of the invention hereinafter described in detail the outer tip of the resilient sealing ring is made stiffer than the central portion thereof. One means for imparting such stiffness is imbedding in the tip of tangential portion a coil of spring wire.

The spring wire heretofore described can be fabricated in various shapes. Thus, the coil may comprise two complete turns of wire, plus a slight overlap of about ¼″. In an alternate construction, the spring wire is in a single coil with a slight overlap. In still another version of the invention, the spring wire is a single coil with the ends of the coil butt welded or otherwise secured together. Besides functioning as a stiffener, the wire performs an additional important function of resisting relative rotation of the resilient seal and the metal sealing ring. Sudden stops and starts of the roller, especially in cold weather, cause the inner surface of the rubber seal to turn on the cylindrical portion of the metal seal ring with which it is in contact. This rotation will damage and may even destroy the seal in a relatively short time. The coil wire causes a tightening of the rubber seal which resists the torque tending to cause rotation. Accordingly, the life of the seal is improved.

Other objects of the present invention will become apparent upon reading the following specification and referring to the accompanying drawings in which similar characters of reference represent corresponding parts in each of the several views.

In the drawings:

FIG. 1 is a longitudinal sectional view through a crawler-type track roller, its shaft and associated structure, showing the present invention installed therein.

FIG. 2 is an enlarged fragmentary, sectional view of a portion of the structure of FIG. 1 showing the seal.

FIG. 3 is an enlarged fragmentary view of a portion of the structure of FIG. 2 showing the rubber seal ring in unstressed condition.

FIG. 4 is a cross-sectional view of a rubber seal ring slightly modified in construction.

FIGS. 5, 6 and 7 are perspective views showing spring wire coils which may be imbedded in the tip of the rubber sealing ring.

A typical crawler type tractor roller 11, roller shaft 12 and associated mechanism is shown in FIG. 1. A plurality of flanged rollers 11 having horizontal transverse axes of revolution are spaced longitudinally on either side of the machine. Such rollers roll upon the continuous tracks (not shown) on either side of the machine which are characteristic of crawler-type tractors. Each roller 11 is supported by an individual stationarily mounted roller shaft 12. Each end of the roller shaft 12 is secured to and mounted below a portion of a horizontal longitudinally extending track rail 13, there being one such rail on each side of the machine. Portions only of the rail 13 are shown in FIG. 1, said portions, being downward extensions from a superimposed connecting structure (not shown) and being keyed to shaft 12 by means of lock keys 14 and secured thereto by means of mounting bolts 16. The weight of the tractor itself is distributed on the track rails 13 and hence is transmitted to shafts 12 and thence to rollers 11.

Each shaft 12 is formed with a horizontal flat surface 17 on the top which is a mounting surface for the rail and is further formed with a recess for lock key 14. Centrally of shaft 12 is an enlarged thrust collar 18 which accommodates endwise thrust of roller 11 relative to shaft 12, and on either side of collar 18 is an elongated, cylindrical, very smooth bearing surface 19. An end collar or cap member 21 is carried at either end of shaft 12 and seals thereto by means of O-ring 22 in groove 23 in shaft 12. Collar 21 has a central hub 24 which fits around the end of cylindrical portion 19 and is formed with recess 26 which is hereinafter described. Collar 21 is also formed with an inwardly-turned outer flange 27 which fits into annular recess 28 in roller 11 and also around peripheral end flange 29 of bushing or rotatable member 31 with a fairly close fit to prevent ingress of large foreign material such as gravel, rocks, etc., betwen collar 21 and roller 11.

Roller 11 shown in FIG. 1 is conventionally formed of two halves 11a, 11b welded together by means of weld 36 along the center and has peripheral flanges 37 which mate with complementary portions of the track shoes to hold the track in alignment with the tractor. Fitting within central bore 38 of roller 11 on either side of thrust collar 18 is bushing 39 which has radially protruding peripheral flange 29 and is secured to roller 11 by means of a plurality of screws 41. The outward facing end of each bushing 31 is formed with recess 40 which is opposed to recess 26 in end collar 21 and is exactly the same in shape. Bushing 39 is preferably cut away as indicated by reference numeral 42 to provide a reservoir for lubricant. Axial glands 43 intercommunicate betwen reservoir 42 and radial ducts 44 in shaft 12.

For purpose of adding lubricant, longitudinally extending lubricating duct 46 may be drilled through the center of shaft 11 from the outer end thereof, the entrance to duct 46 being closed off by means of a cap 47 between lubrications. Radial secondary ducts 44 extend from central duct 46 at either end of the roller to carry lubricant to the bearings. The maintenance of proper lubrication of the bearing surfaces 19 is of extreme importance particularly under the severe operating conditions to which track rollers are subjected. Further reservoir 42 is maintained with lubricant through glands 43.

One preferred bearing shown in FIG. 1 has bronze, sleeve-type extended cylindrical portions 51 on either side of collar 18 interposed between bushing 39 and cylindrical surface 19 of shaft 12 and having an annular outturned thrust flange 52 between the inner end of bushing 39 and collar 18. Thus the bearing assumes both radial and longitudinal forces relative to roller 11 and shaft 12.

The construction of roller 11, roller shaft 12 and bearing 51 heretofore described is more or less conventional and is subject to considerable variation. A particular feature of the invention is provision of means for sealing lubricant between bearing surfaces 19 and sleeve 51 and sealing against ingress of foreign contaminants. Directing attention first to enlarged FIG. 2 it will be seen that recess 26 has a radial, annular outer shoulder 56, an inwardly directed but outwardly diverging conical surface 57 and an inwardly turned nose 58. Similarly, recess 40 has an inner radial shoulder 56a, a conical outwardly diverging surface 57a and an inwardly turned nose 58a. Within recess 26 is one metal seal member or metal sealing ring 61 and one resilient seal member or resilient ring 62, while within recess 40 is one metal seal member or metal sealing ring 61a and resilient seal member or resilient ring 62a. Rings 61, 61a and seals 62, 62a are identical.

Each ring 61 is fabricated of a special steel alloy hardened by heat processing to be extremely wear resistant, has a short cylindrical portion 66 of inside diameter larger than the outside diameter of shaft 12 so that ring 61 may float relative thereto both radially and axially. A flange 67 is formed on one end of cylindrical portion 66, flange 67 having a conical surface 68 which, particularly with passage of time, terminates in an outer radial flat surface 69 which mates with the corresponding surface of the opposite ring. The mating surfaces 69 are lapped so that they fit in an interface which is in extremely close contact. Hence as the rings 61, 61a rotate relative to each other, a precise seal is maintained. The seal between the two flanges is such that fluids, greases, gases and the like are prevented from either leaving or entering the interior of the housing.

As a means of maintaining the metal sealing members 61, 61a in contact, there is provided a pair of specially shaped interchangeable resilient or elastic seal rings 62, 62a which may be made of rubber or a substitute for rubber.

Referring to FIG. 3, which shows ring 62 or 62a in its relaxed or unstressed condition, the central portion or resilient midsection 71 of the ring has a curvilinear shape approximating an ellipse with its major axis 72 at an angle A of about 30° relative to a line 73 drawn radially relative to the axis of rotation of the shaft 12. A tangential or tail portion or inner cylindrical portion 74 is drawn approximately perpendicular to line 73 with a cleft 76 separating tail 74 from central portion 71. Tail 74 widens as it proceeds outwardly toward outer end or tip 77. Described in other terms, surface 78 of tail 74 is approximately perpendicular to line 73 while surface 79 is at an angle of approximately 15° relative to surface 78.

In the assembled or stressed position of the device as best shown in FIG. 2, the tip 77 of tail 74 abuts flange 67 and is pushed inwardly. This movement causes a rotation of axis 72 about point 75 where it intersects line 73 so that angle B is substantially greater than angle A, being in the neighborhood of approximately 40°. Cleft 76 is diminished in size by reason of such distortion. The distortion of the central portion 71 causes an outward expansion of portion 71 which results in a tight sealing engagement with surface 57 or 57a at the outside and further a tight engagement of surface 78 with the cylindrical portion 66 and this seals members 61a and 31 together insofar as ingress or egress of lubricant or foreign material is concerned. At the same time, the tip 77 is in firm engagement with the back of flange 67 resulting in a further sealing engagement. More importantly, however, the effect of tip 77 bearing against flange 67 is to bias flange 67 against the corresponding flange of the mating metal seal ring thereby bringing about a metal-to-metal sealing contact.

It will be seen that in the stress position of the assembly, in addition to the sealing heretofore described, there is also a floating support of the metal seal rings 61, 61a in both a radial direction relative to shaft 12 and also in an axial direction. Such floating support tends to maintain the metal seal ring centrally aligned with respect to the recess in which it is mounted. It will thus be seen that the resilient rings 62 maintain a constant load on the metal ring 61 and also permit a floating action of the seal ring 61 to assimilate radial shock, end thrust, and excessive end play while at the same time accomplishing great sealing efficiency under severe operating conditions.

The abutting surfaces 69 of the metal rings are preferably very smooth, being plane-lapped and preferably of small surface area accomplished by tapering the planed portions 68 to generally reduce frictional forces between the same while providing a good running seal therebetween. Each of the tapered portions 68 makes an angle in the range of 2° to 2½° with respect to the plane abutting surfaces 69 of the metal ring. As initially manufactured the plane abutting surfaces 69 of the rings are relatively small in cross sectional area, but, in use, as the surfaces wear, they gradually enlarge as the result of the configuration created by the tapered portion.

In the form of the invention shown in FIGS. 2 and 3, the seal rings 62, 62a are formed of a synthetic rubber material such as butadiene vinyl chloride having a shore hardness of about 70.

In the modification of the invention shown in FIG. 4, the tip 74a is stiffened by imbedding therein a coil of spring wire or music wire 88. Coil 88, as best shown in FIG. 7, comprises two complete turns plus an overlap of about ¼". The coil in formed shape prior to imbedding in the sealing ring is substantially cylindrical. Each coil may be formed of approximately 0.041" diameter music wire and the adjacent coils are tight against each other. This construction has a highly desirable resiliency and is more resistant to wear than sealing rings which do not have spring wire imbedded therein.

As shown in FIG. 6, a single coil of wire 88a with a slight overlap of about ¼" may be substituted. As shown in FIG. 5, a single coil 88b which is joined at joint 89 by butt welding or other means may likewise be used.

Preferably, the coils 88 may be imbedded at the time of the molding of the rings in a manner well understood in this art.

In use, the roller 11, bushings 39, bearing sleeves 51 and shaft 12 are assembled as shown in FIG. 1. The resilient seals 62, 62a slip around the metal seal rings 61, 61a. Thereupon the inner metal and resilient rings 61a, 62a are slipped into recess 40 in the end of bushing 31 and the outer metal and rubber seal rings 61, 62 are slipped into recess 26 in end collar 21. End collars 21 are then applied which causes the abutting surfaces 69 of the metal seal rings to mate and, as the end collars are drawn into place the seal rings 62 deform from the relaxed position in FIGS. 3 and 4 to the stressed position shown in FIG. 2, thereby effectively sealing the metal rings 61, 61a against each other with a running fit and sealing the metal rings to their respective housings. Lubricant is then forced into the bearing structure by removing cap 47 and pumping in lubricant (preferably a lubricating oil) which fills the reservoir 42 and the hollow 46 in the shaft.

Operation of the tractor causes roller 11 to revolve relative to stationary shaft 12. The resilient seal ring 62a causes metal seal ring 61a to revolve with roller 11 while the outer seal ring 62 causes the outer metal ring 61 to remain stationary with shaft 12. However, excessive shock or stress may be accommodated by slight relative movement of one of the metal rings 61 or 61a with respect to its housing.

As has been previously stated, the resilient rings 62 cause the metal rings 61 to seal against each other and also to be sealed with respect to their respective housings. The metal rings 61 float, being biased substantially concentric with the axis of shaft 12, but under severe stresses eccentricity may be accommodated. Further, the flanges 69 of the metal seal rings are maintained in contact so that the position of the rings as shown in FIG. 1 is maintained, but where there are excessive end thrusts the metal rings may move in an axial direction, it being noted that there are slight clearances at each end of cylinders 66 to accommodate such movement.

In the structure of FIG. 1, sleeve bearing bushings 51 are used. It will be recognized that other bearings may be substituted such as roller bearings, ball bearings, and the like, to support the load of roller 11 relative to shaft 12.

The foregoing description has been confined primarily to a sealing means in the environment of a track roller bearing seal. It will be understood, however, that use of the invention is not necessary so confined and that the structure may be incorporated to seal other relatively rotative parts against escape of lubricant or other fluid or ingress of external contaminants.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a seal construction, a shaft, a rotatable member mounted for rotation about said shaft, said rotatable member formed with a first annular recess adjacent one end of said member, a cap on said shaft at said end of said member, said cap formed with a second annular recess directly opposite and facing said first recess, each said recess having an outwardly diverging conical surface, a first metal ring at least partially disposed in said first recess, a second metal ring at least partially disposed in said second recess, said metal rings each having a cylindrical portion encompassing said shaft and of greater diameter than said shaft and an abruptly outwardly projecting flange on one end of said cylindrical portion, the flanges of said metal rings being in intimate metal-to-metal sealing contact, a first resilient ring disposed around said cylindrical portion of said first metal ring and disposed in said first recess, a second resilient ring disposed around said cylindrical portion of said second metal ring and disposed in second recess, each said resilient ring being stressed in assembled position and shaped with a resilient midsection of relatively large cross section, said midsection sealing tightly against said conical surface, and having a small diameter inner cylindrical portion integrally joined with said midsection lying along the outside of said cylindrical portion of said metal ring and being of substantially greater length than the thickness of said midsection and terminating in a tip bearing against the flange of the metal ring about which said resilient ring is disposed, said resilient rings urging said flanges into contact and floatingly mounting said metal rings approximately centrally relative to said shaft.

2. A seal construction according to claim 1 in which said tip is thicker than said inner cylindrical portion at its juncture with said midsection.

3. A seal construction according to claim 1 in which said tip is substantially stiffer than said midsection.

4. A seal construction according to claim 1 which further comprises a coil of spring wire imbedded in said tip, said cylindrical portion of said resilient ring gripping said cylndrical portion of said metal ring to restrain relative rotation under torque.

5. A seal construction according to claim 4 in which said coil is formed of music wire in helical shape with adjacent wires in close proximity with an overlap of about ¼".

6. A seal construction according to claim 4 in which said coil is formed of music wire with the ends of said coil butting.

7. A seal construction according to claim 4 in which said coil is formed of music wire in helical shape with adjacent wires in close proximity, each said coil comprising two complete turns plus an overlap of about ¼".

8. A seal construction according to claim 1 in which said midsection is generally elliptical with the major axis tilted at its outer end toward said flange, said major axis being more tilted in stressed position than in unstressed position.

9. In a sealing arrangement of the character described a pair of relatively rotating housing members which are spaced to define a space which is desired to be sealed, said housing members each having an annular inner recessed portion defined in part by an inwardly extending tapered surface, a pair of sealing rings having contacting sealing surfaces and providing a running fit, a pair of ring-shaped resilient seal members disposed correspondingly between a corresponding housing part and a corresponding one of said rings, each of said elastic resilient seal members being generally annular and having an integrally formed tail portion extending along a corresponding one of said sealing rings and having an outer tip bearing against said ring-shaped element, said resilient seal members bearing against said tapered surface, said resilient seal members being compressed along their axes to floatingly support said sealing rings and to maintain pressure between said contacting surfaces of said rings, each of said rings being a flanged ring and each having a cylindrical portion contacted by a corresponding one of said sealing elastic sealing elements.

10. A generally resilient seal member having generally an elliptical central portion with an integrally formed tail portion tangentially disposed along the inside of said central portion, said resilient seal member being of resilient material, said tail portion being substantially longer than the thickness of said central portion, the major axis of said central portion being tilted relative to a radial line through the center at an acute angle in the same direction as said tail portion extends.

11. A resilient seal ring according to claim 10 in which the outer tip of said tail portion is relatively hard and said body portion relatively soft.

12. A resilient seal ring according to claim 11 which further comprises a coil of wire imbedded in said tip.

References Cited

UNITED STATES PATENTS

| | | | |
|---|---|---|---|
| 96,654 | 11/1869 | Andrews | 277—235 |
| 2,254,060 | 8/1941 | Crickmer | 277—179 |
| 2,390,372 | 12/1945 | Johnston et al. | 277—164 |
| 2,590,759 | 3/1952 | Dale et al. | 277—93 |
| 2,736,586 | 2/1956 | Riesing | 277—179 |
| 2,743,950 | 5/1956 | Helfrecht et al. | 277—179 |
| 2,790,624 | 4/1957 | Lofqvist et al. | 277—164 |
| 2,872,219 | 2/1959 | Cobb | 277—179 |
| 2,953,398 | 9/1960 | Haugen et al. | 277—227 |
| 3,073,657 | 1/1963 | Oxford | 277—92 |
| 3,086,782 | 4/1963 | Peickii et al. | 277—92 |
| 3,125,347 | 3/1964 | De Moude | 277—92 |
| 2,145,597 | 1/1939 | Hait | 277—235 |
| 3,167,321 | 1/1965 | Land et al. | 277—92 |
| 3,180,648 | 4/1965 | Kupfert et al. | 277—92 |

LAVERNE D. GEIGER, *Primary Examiner.*

D. MASSENBERG, *Assistant Examiner.*